No. 855,799. PATENTED JUNE 4, 1907.
J. F. MITCHELL.
FLUID PRESSURE ENGINE.
APPLICATION FILED FEB. 20, 1905.
4 SHEETS—SHEET 2.
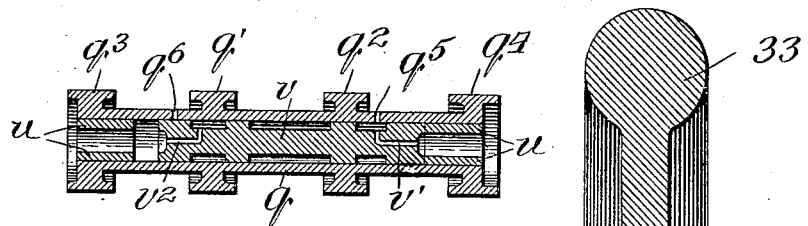
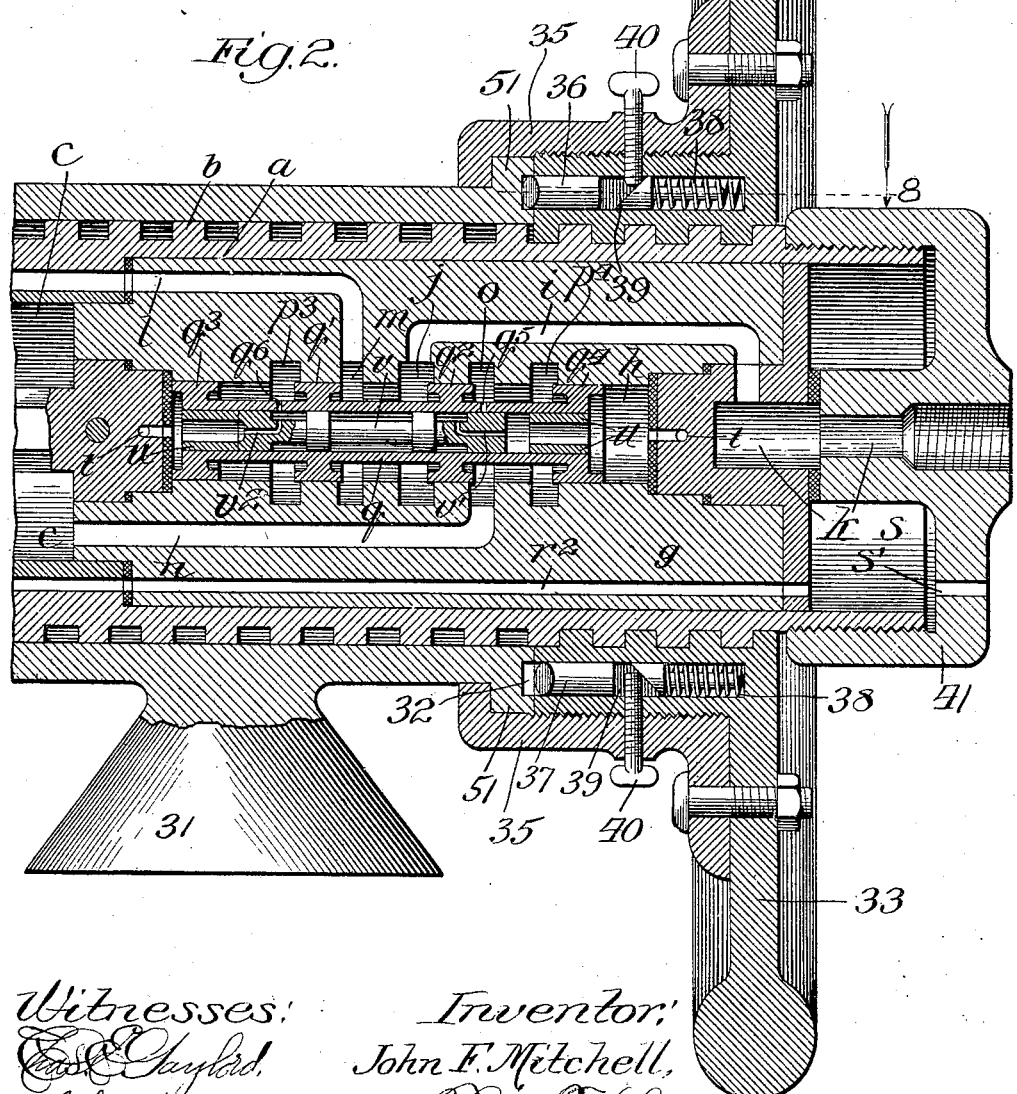
Witnesses:  Inventor:
John F. Mitchell,
By Thomas F. Sheridan,
Atty

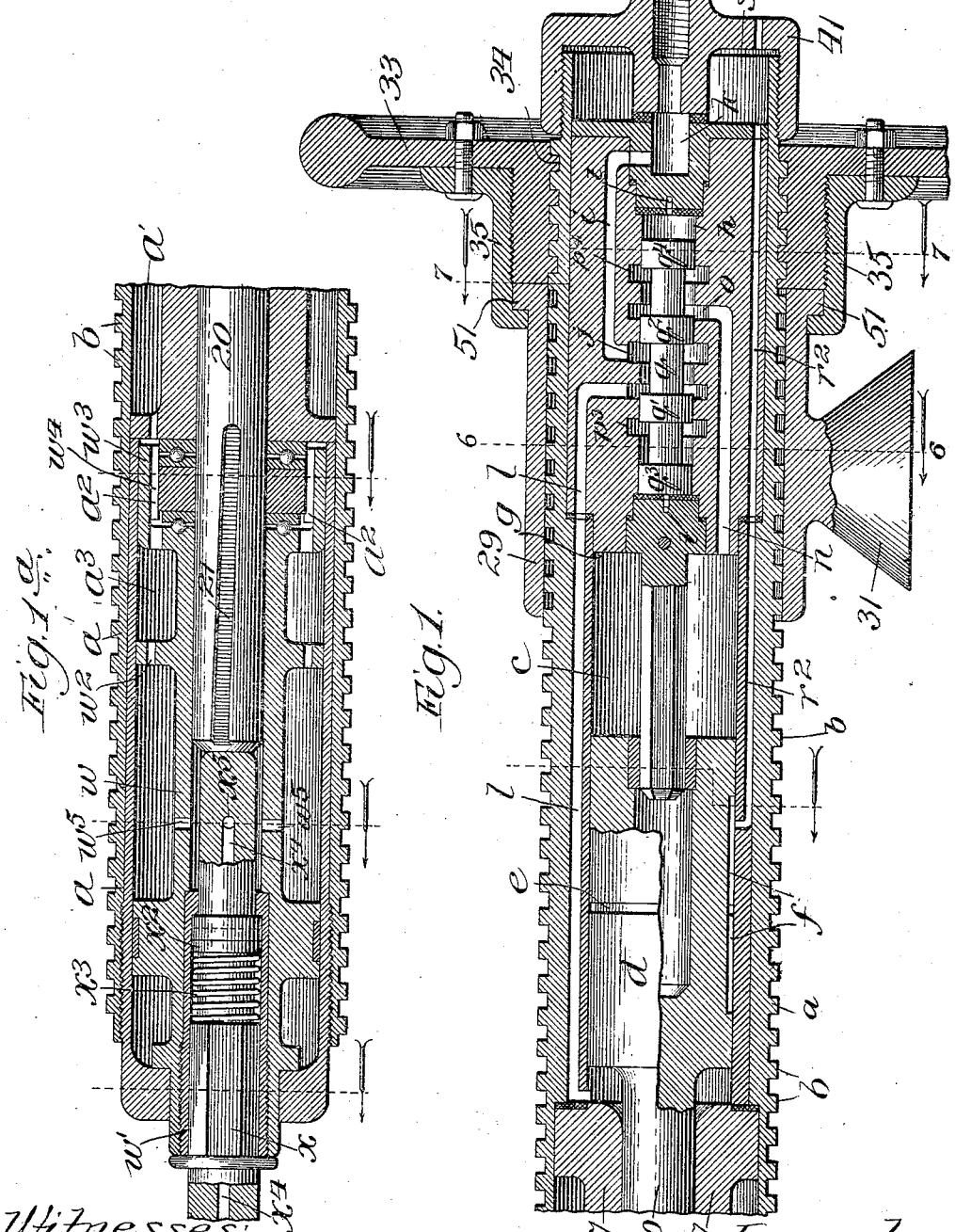

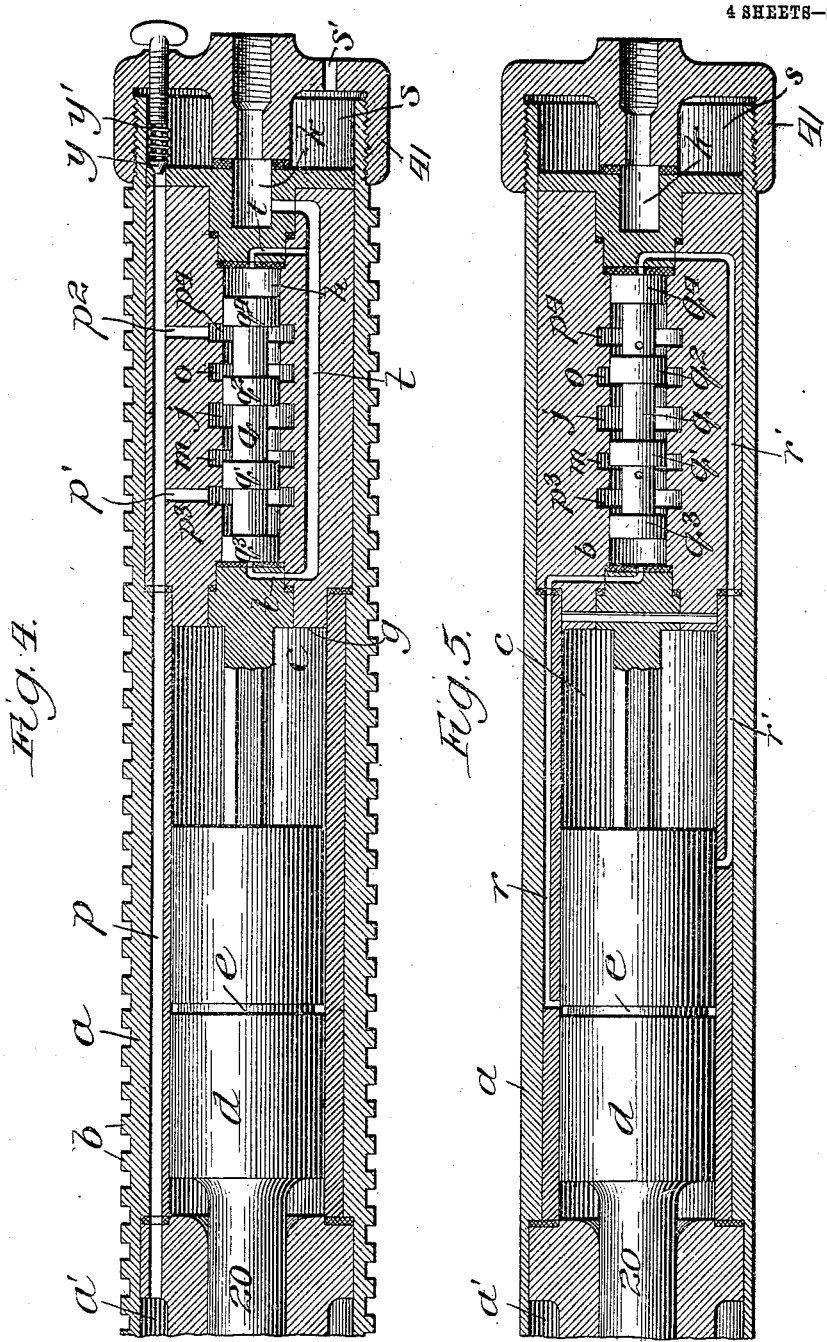

No. 855,799. PATENTED JUNE 4, 1907.
J. F. MITCHELL.
FLUID PRESSURE ENGINE.
APPLICATION FILED FEB. 20, 1905.
4 SHEETS—SHEET 4.
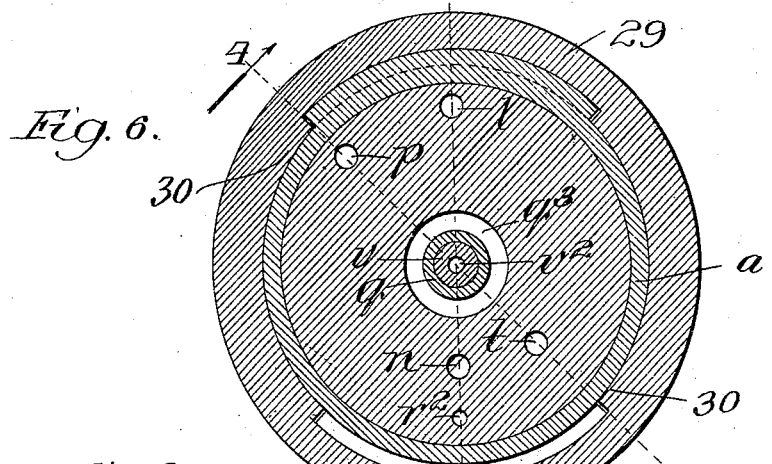
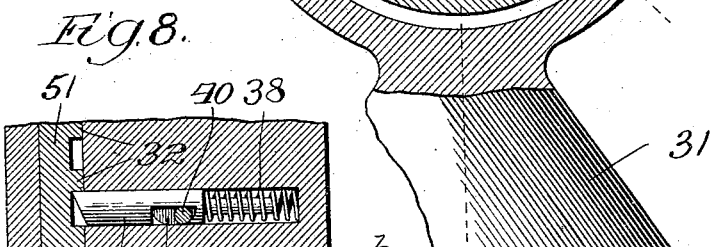
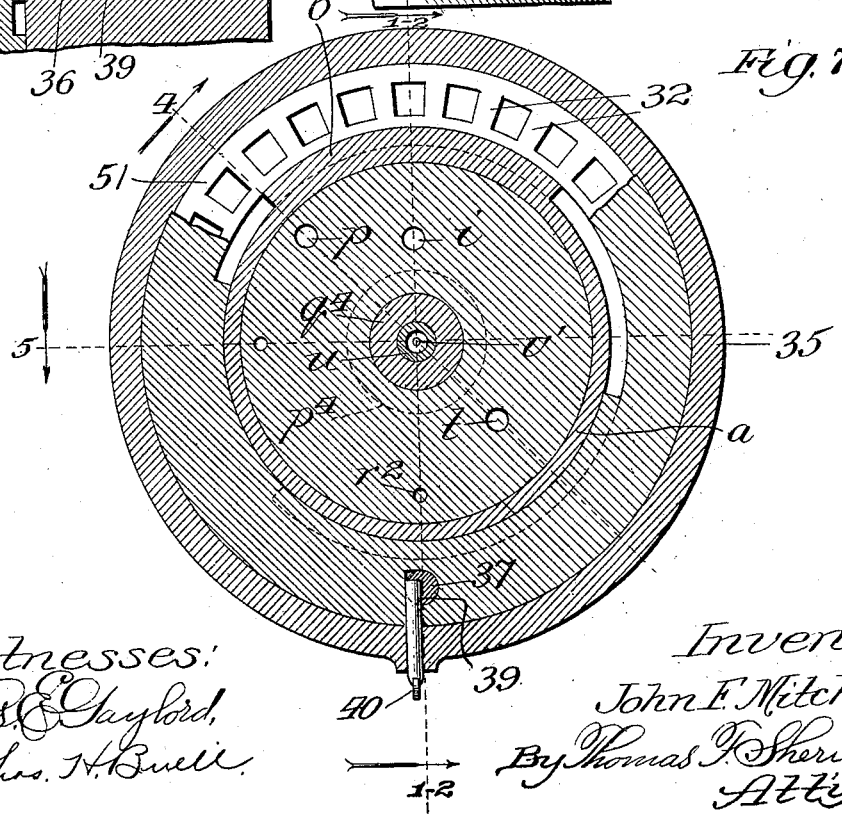

UNITED STATES PATENT OFFICE.

JOHN F. MITCHELL, OF TOPEKA, KANSAS.

FLUID-PRESSURE ENGINE.

No. 855,799.      Specification of Letters Patent.      Patented June 4, 1907.

Application filed February 20, 1905. Serial No. 246,546.

*To all whom it may concern:*

Be it known that I, JOHN F. MITCHELL, a citizen of the United States, residing at Topeka, in the county of Shawnee and State of Kansas, have invented certain new and useful Improvements in Fluid-Pressure Engines, of which the following is a specification.

My invention, generally speaking, relates to fluid pressure engines, and has especial reference to the details of construction and arrangement of parts, all of which will more fully hereinafter appear.

The principal object of the invention is to provide a simple, economical and efficient fluid pressure engine. Other and further objects of the invention will appear from an examination of the drawings and the following description and claims.

In the accompanying drawings—Figure 1 is a longitudinal sectional elevation of the rear portion of a fluid pressure engine as it appears when constructed in accordance with these improvements. Fig. 1ª a continuation of the forward portion of the same, shown in longitudinal sectional elevation; Fig. 2 an enlarged sectional detail of the rear portion of the drill shown to the right of Fig. 1 with the controlling mechanisms in one position; Fig. 3 a longitudinal sectional detail of the controlling valve mechanisms shown in Fig. 3, illustrating such parts in a second position; Fig. 4 a longitudinal sectional detail of the cylindrical shell, valve casing, and other attached parts, taken on line 4 of Figs. 10 and 11; Fig. 5 a longitudinal sectional detail of the rear end of the cylindrical shell and interior mechanisms, taken on line 5 of Fig. 11; Fig. 6 is an enlarged cross sectional view taken on the line 6 of Fig. 1 looking in the direction of the arrow. Fig. 7 is an enlarged cross sectional detail taken on two planes, as indicated by the line 7—7 of Fig. 1 looking in the direction of the arrow. Fig. 8 is an enlarged sectional detail taken on the line 8 of Fig. 2 looking in the direction of the arrow.

In constructing a fluid pressure engine in accordance with these improvements, a cylindrical shell $a$ is provided having an exteriorly threaded portion $b$, which is used for feeding said shell and its supported mechanisms backwardly and forwardly, as will be more fully hereinafter set forth. This shell portion is provided with an internal bore, one portion of which forms what is termed herein an "operating" chamber $c$, and axially arranged therein. Reciprocatingly mounted in this operating chamber is a hammer-piston $d$, which is provided at its middle portion with an annular exhaust groove $e$ and on one portion of its cylindical surface with a longitudinal exhaust groove $f$ connecting with said annular exhaust groove. To reciprocate this hammer-piston, a valve casing $g$ is provided, arranged in the rear portion of the bore of said cylindrical shell and attached thereto in any desired manner. For ease of manufacture this valve casing is made separable from the cylindrical shell, though to all intents and purposes when in operative position it is really an immovable portion thereof. The valve casing is provided with an axially arranged cylindrical valve chamber $h$, which is in turn provided with a plurality of annular grooves, for the purposes hereinafter set forth.

A supply passage $i$ is provided and connected with the middle or intermediate annular groove $j$ of said valve chamber and with a main supply passage $k$ adapted to be connected by means of a hose or tube—not shown—with some suitable source of fluid pressure supply, either compressed air or steam. A passage $l$ is also provided and connected with one of the annular grooves $m$, to one side of the intermediate groove $j$ and the forward end of the operating chamber. A second passage $n$ is provided, which connects the annular groove $o$ on the opposite side of the intermediate groove $j$ with the rear end of the operating chamber. A main exhaust passage $p$ is provided—see Fig. 4—and extends longitudinally through the cylindrical shell and different bushings or casing mounted therein to the forward and rear end of said cylindrical shell. This main exhaust passage is provided with two branch passages $p'$ and $p^2$, which connect it with the annular grooves $p^3$ and $p^4$ at or near each end of the valve chamber.

A spool-shaped piston-controlling valve $q$ is provided and mounted in said valve chamber, and is provided with four circumferential shoulder portions $q'$, $q^2$, $q^3$ and $q^4$, so constructed and arranged that as shown in Fig. 2 the supply passage $i$ and the passage $l$, which leads to the forward end of the operating chamber, are connected so as to furnish a supply of motive fluid to said chamber; while as shown in Figs. 2 and 4 the annular grooves $o$ and $p^4$ are connected together, so that the passage $m$ that leads to the rear end of said operating chamber is connected with the branch exhaust passage $p^2$ and thereby with the main exhaust, to exhaust any fluid pressure from the rear end of said chamber, all of which tends to move said piston hammer rearwardly.

To operate the controlling valve and thereby maintain the reciprocations of the hammer-piston as long as desired, or as long as a supply of motive fluid can be obtained, a supplemental passage $r$ is provided, which leads from a desired forward point of the operating chamber—see Fig. 5—to the forward end of the valve chamber. A second supplementary passage $r'$ is also provided, which leads from a desired rear point of the operating chamber—see same figure—to the rear end of the valve chamber. A supplementary exhaust passage $r^2$—see Figs. 1 and 2—is provided, which leads from a desired middle point of the operating chamber rearwardly through the mechanisms to connect with a main exhaust chamber $s$. During the reciprocations of the parts the annular exhaust groove $e$ in the middle of the reciprocating hammer piston alternately connects with and is disconnected from each of said supplementary passages $r$ and $r'$, so as to alternately exhaust pressure from each end of the valve chamber between the rear wall thereof and the rear end of the controlling valve, thus permitting any fluid pressure which may be in the opposite end to move said valve in the direction of least resistance. To assist in these movements a supplementary passage $t$ is provided, which connects with the main passage $k$—as shown in Fig. 4—and, by means of the radially extending branches, is connected with the end of the valve chamber to furnish a constant and small supply of motive fluid thereto, which, being differentiated by the exhaust hereinabove described, operates said controlling valve. To more perfectly govern these operations of the controlling valve, said valve is axially bored—see Figs. 2 and 3—the bore being closed at each end by hollow sleeves $u$. Arranged in this axial bore of the controlling valve is a supplementary or sub-valve $v$—of the piston type—which is provided with a plurality of circumferential flanges or shoulders. The main controlling valve is provided with a radially extending minor exhaust perforation or passage $q^5$ at one end and with a similar passage $q^6$ at the other end, and the sub-valve is also provided with a minor exhaust passage $v'$ at one end and with a similar passage $v^2$ at the other end.

When the parts are in the position shown in Fig. 2 it will be seen that the minor exhaust passages at the rear end of the controlling valve mechanism are disconnected, while those at the forward end are in operative connection, so that any fluid under pressure that is passing into the forward end of the valve chamber by means of the supplementary supply passage $t$ will blow through these minor exhaust passages into the annular groove $p^3$ of the valve chamber and pass out through the branch exhaust passage $p'$ into the main exhaust passage $p$, and from thence into the open air, as hereinafter described. The superior pressure at the rear end of the valve chamber will maintain the parts in this position until the relative pressures are reversed in each end of said valve chamber.

As the reciprocating piston-hammer is moved rearwardly, in the manner first above described, the annular exhaust groove $e$ therein connects for an instant with the supplementary passage $r'$ so that some of the fluid pressure at the rear end of the valve chamber will pass out through the passage $r'$ into said annular groove, from thence—see Fig. 1—into the longitudinal exhaust groove $f$, thence through the supplementary exhaust passage $r^2$ into the main exhaust chamber, out of which it passes through the opening $s'$—see Fig. 4—into the open air. As this is a quick exhaust, the difference of pressure is suddenly disturbed, so that the pressure in the forward end of the valve chamber moves said controlling valve instantly and rearwardly toward the point of least resistance. This action throws such valve mechanism into the position shown in Fig. 3, which disconnects the minor exhaust passage at the forward end of said controlling valve mechanism and operatively connects those at the rear end. The valve mechanisms being thrown, as above described, to the rear position—that is, to the position opposite that shown in Figs. 1, 4 and 5—they are maintained in such position by the relative superior pressure at the forward end of said valve chamber; and when said valve parts are in said position the fluid pressure supply passage $i$ is connected with the passage $n$, thereby furnishing a supply of motive fluid to the rear portion of the operating chamber. At the same time the passage $l$, by means of its annular groove $m$, is connected through the medium of the annular groove $p^3$ with the branch exhaust passage $p'$ to exhaust any motive fluid from the forward end of said operating chamber, and thus permit a forward movement of the hammer-piston.

During the forward movement of the hammer-piston, the annular exhaust groove connects, for an instant, with the supplementary groove $r$—see Fig. 5—of the forward end portion of the valve chamber and exhausts some of the motive fluid therein, which, passing through said grooves and the longitudinal exhaust groove $f$ and supplementary exhaust passage $r^2$ into the main exhaust chamber, reduces the relative pressure so as to obtain a reverse movement of the controlling valve mechanisms from that just above described. The supply and exhaust passages are thus connected and disconnected in such a manner as to obtain another rearward movement of the hammer-piston after such part reaches its forward position, all of which will be understood and appreciated by those skilled in the art. These operations will be connected in a successive manner as long as motive fluid is supplied to the mechanisms.

The engine above described, as will be readily understood, may be used to operate many kinds of tools, such as hammers, drills, pumps, etc., and when so used it is sometimes desirable to provide some means for holding the organized machine in position, either by means of a tripod or pillar. In order so to do, the exterior threaded surface of the cylindrical shell is provided with two longitudinal grooves 28, which cut said threads substantially from one end of the shell to the other, as shown substantially in Fig. 7. A supporting sleeve 29 is provided, the bore of which is in turn provided with two inwardly extending lug portions 30 that engage the longitudinal grooves in the exterior portion of the shell and prevent it from rotating, while at the same time permitting of its having longitudinal movements. This supporting sleeve is provided with a cylindrical cone-shaped projecting portion 31, adapted to be mounted in any kind of clamping mechanism to attach it to a desired pillar, which is not shown herein.

To feed the main shell with the attached mechanisms forward and backward, the supporting sleeve is provided with a flanged portion 51, at its rear end, the face of which—as shown in Figs. 8 and 9—is provided with a plurality of rearwardly extending teeth 32. A combined hand-wheel and nut 33 is provided, having an interior threaded bore 34 engaging with the threads on the exterior surface of the cylindrical shell. This combined hand wheel and nut is provided with a clamping sleeve 35 surrounding the rear end flange of the holding-sleeve, so as to permit of independent rotations of the parts. Stated otherwise, it permits said wheel and nut to be rotated, and thereby to move the main shell backward and forward—see Figs. 1 and 2.

It is desirable to provide means which may be manipulated by the operator that will permit rotation of this hand wheel at any time in either direction, or whenever desired, to permit it to be rotated in one direction only. For this purpose the hand wheel is provided with two longitudinal recesses, having spring-pressed dogs 36 and 37 arranged therein. The dog 36 at the forward end—as shown in Fig. 9—is beveled in one direction, while the forward end of the dog 37 is beveled in an opposite direction, each of these dogs—when free from other extraneous mechanisms—being held at its forward limit of motion by means of helically coiled springs 38. Each of these dogs is provided near its rear portion with beveled slots 39, arranged to be contacted by the points of detent screws 40. As shown in Fig. 2, the detent screw 40, at the lower portion of the figure, is holding the dog 37 in its rearward position and out of engagement with the teeth on the face of flange 31. This permits the combined hand-wheel and nut to be rotated in one direction—opposite to the movements of the hands of a clock—so as to feed the cylindrical shell forward. The forward end of dog 37 being beveled in an opposite manner from that of the dog 36, an opposite rotation of the hand wheel may be effected when its detent screw is released to permit of the engagement of said dog with the teeth 32, and the dog 36 is then retracted by means of its detent screw 40, and a retractile movement of the cylindrical shell thereby obtained. Whenever it is desired, both of the detent screws may be moved inwardly, which action will retract both of the holding dogs to their rear limit of motion and permit the hand-wheel to be rotated in either direction, as desired—all of which will be understood and appreciated by those skilled in the art.

As shown in Figs. 1 and 2, the main exhaust chamber is formed by means of a cap 41, which has screw-threaded engagement with the rear end of the main shell—preferably forming a separable part thereof. It will be noticed also from an inspection of Figs. 1ª, 4 and 5 that there are several bushings inserted within the inner bore of the main cylindrical shell. These bushings are made preferably of highly carbonized steel and separable from the main shell for ease of manufacture and repairs.

I claim:—

1. In an engine, the combination of a cylinder having an operating piston therein, a valve for controlling the fluid supply to the cylinder, means for continually supplying operative fluid to the ends of the valve, a second valve slidable within the first valve to control the exhaust of operative fluid from the first valve chamber, and means depending upon the position of the main piston for controlling said second valve.

2. In an engine, the combination of a cylinder, a piston reciprocatingly mounted in said cylinder, a valve chamber axially arranged with respect to said main cylinder, a main controlling valve in said chamber, continually opened, passages leading from the main fluid supply to the ends of the valve cylinder, a secondary valve within the main valve for controlling the exhaust passages from the ends of the valve chamber, and means depending upon the position of the main piston for operating said secondary valve.

3. In an engine, the combination with a main cylinder of a piston reciprocatingly mounted therein, a valve chamber having a piston valve portion reciprocatingly mounted therein, passageways leading from the forward and rearward ends of the main cylinder to the annular cavities of the valve chamber, a main supply cavity leading to an annular cavity of the valve chamber, passageways connecting the ends of the valve chamber continually with the main supply cavity, a cylindrical bore within said main valve, a secondary valve reciprocatingly mounted within the cylinder of the main valve, means depending upon the position of the main piston for controlling the position of the secondary valve within the main valve, and means depending upon the position of the secondary valve within the main valve for controlling the operation of the main valve.

JOHN F. MITCHELL.

Witnesses:
 WILLIAM W. BOLLARD,
 LOUIS P. BAYHA.